United States Patent [19]

Miller et al.

[11] Patent Number: 4,765,601

[45] Date of Patent: Aug. 23, 1988

[54] HYDRAULIC-ELASTOMERIC MOUNT

[75] Inventors: John W. Miller, Centerville, Ohio; Linn A. Peterson, Milford; Charles A. Kingsley, Utica, both of Mich.

[73] Assignee: General Motors Corporation, Detroit, Mich.

[21] Appl. No.: 85,308

[22] Filed: Aug. 10, 1987

Related U.S. Application Data

[63] Continuation of Ser. No. 902,060, Aug. 26, 1986, abandoned, which is a continuation of Ser. No. 706,675, Feb. 28, 1985, abandoned.

[51] Int. Cl.$^4$ .................... F16M 5/00; B60G 15/04
[52] U.S. Cl. .................... 267/140.1; 248/562; 248/636; 267/35; 267/219
[58] Field of Search .................... 267/140.1, 35, 8 R, 267/195, 219, 217, 140.5; 248/562, 565, 636, 638

[56] References Cited

U.S. PATENT DOCUMENTS

| | | | |
|---|---|---|---|
| 2,387,066 | 10/1945 | Harding | 188/298 X |
| 4,159,091 | 6/1979 | Le Salver et al. | 267/140.1 X |
| 4,383,679 | 5/1983 | Kakimoto | 267/140.1 |
| 4,416,445 | 11/1983 | Coad | 267/140.1 X |
| 4,418,897 | 12/1983 | Härtel et al. | 267/140.1 |
| 4,645,189 | 2/1987 | Quast | 267/140.1 |

FOREIGN PATENT DOCUMENTS

| | | | |
|---|---|---|---|
| 27751 | 4/1981 | European Pat. Off. | 267/140.1 |
| 115174 | 8/1984 | European Pat. Off. | 248/562 |
| 3140783 | 4/1983 | Fed. Rep. of Germany | 267/35 |

*Primary Examiner*—George E. A. Halvosa
*Assistant Examiner*—Matthew C. Graham
*Attorney, Agent, or Firm*—R. L. Phillips

[57] ABSTRACT

A hydraulic-elastomeric vehicle engine mount basically comprising a pair of rigid mounting members, a hollow elastomeric body connecting the members, an elastomeric diaphragm cooperating with the body to form a closed cavity that is filled with a liquid, a partition dividing the cavity into a chamber enclosed by the body and a chamber enclosed by the diaphragm, a damping orifice connecting the chambers so as to provide hydraulic damping as one mounting member is forced to vibrate relative to the other in opposite directions, and a damping decoupler mounted for limited movement on the partition so as to effect cyclic volume change in the chambers and thereby permit vibratory amplitudes without hydraulic damping. To this arrangement is added a secondary orifice through the partition for connecting the chambers, and a jounce-rebound valve movable with the decoupler for opening and closing the secondary orifice so as to effect a reduction in the hydraulic damping in one of the force directions as compared with that in the other force direction during the damping decoupler operation.

2 Claims, 3 Drawing Sheets

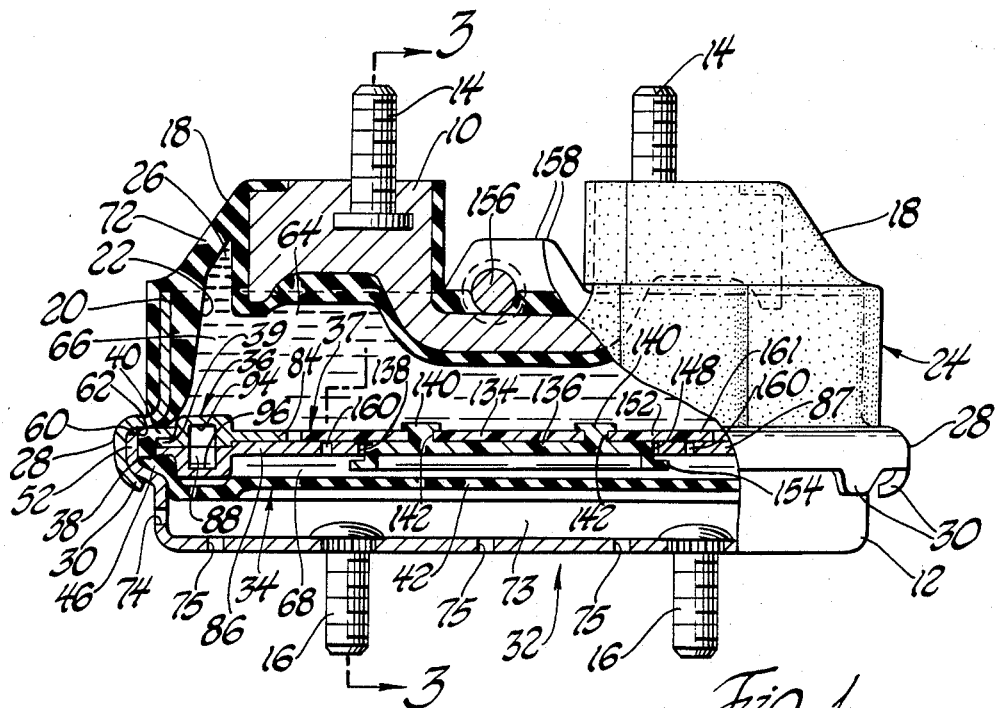
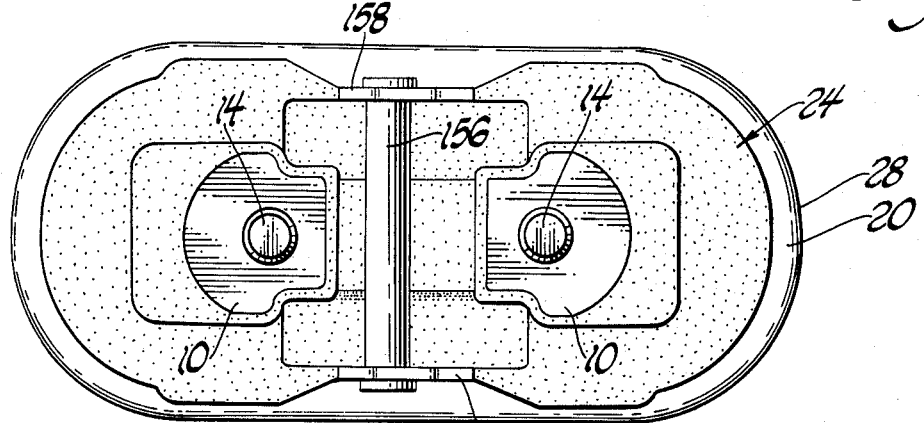
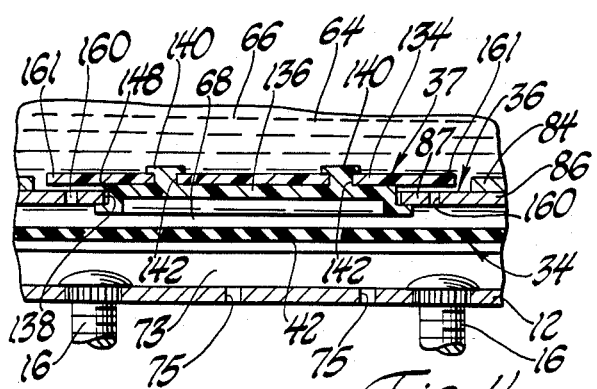
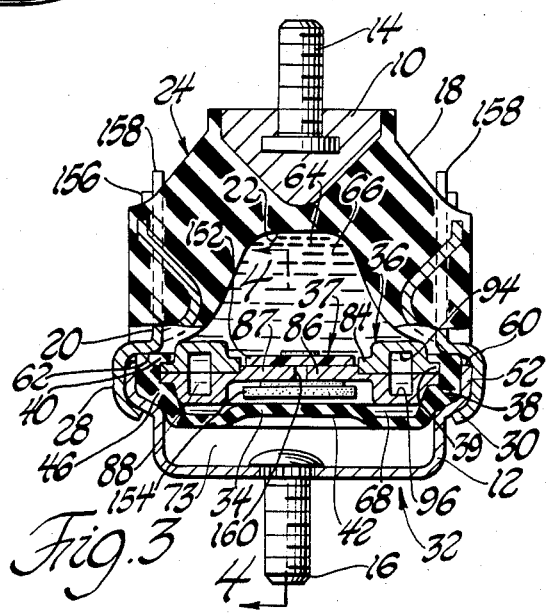

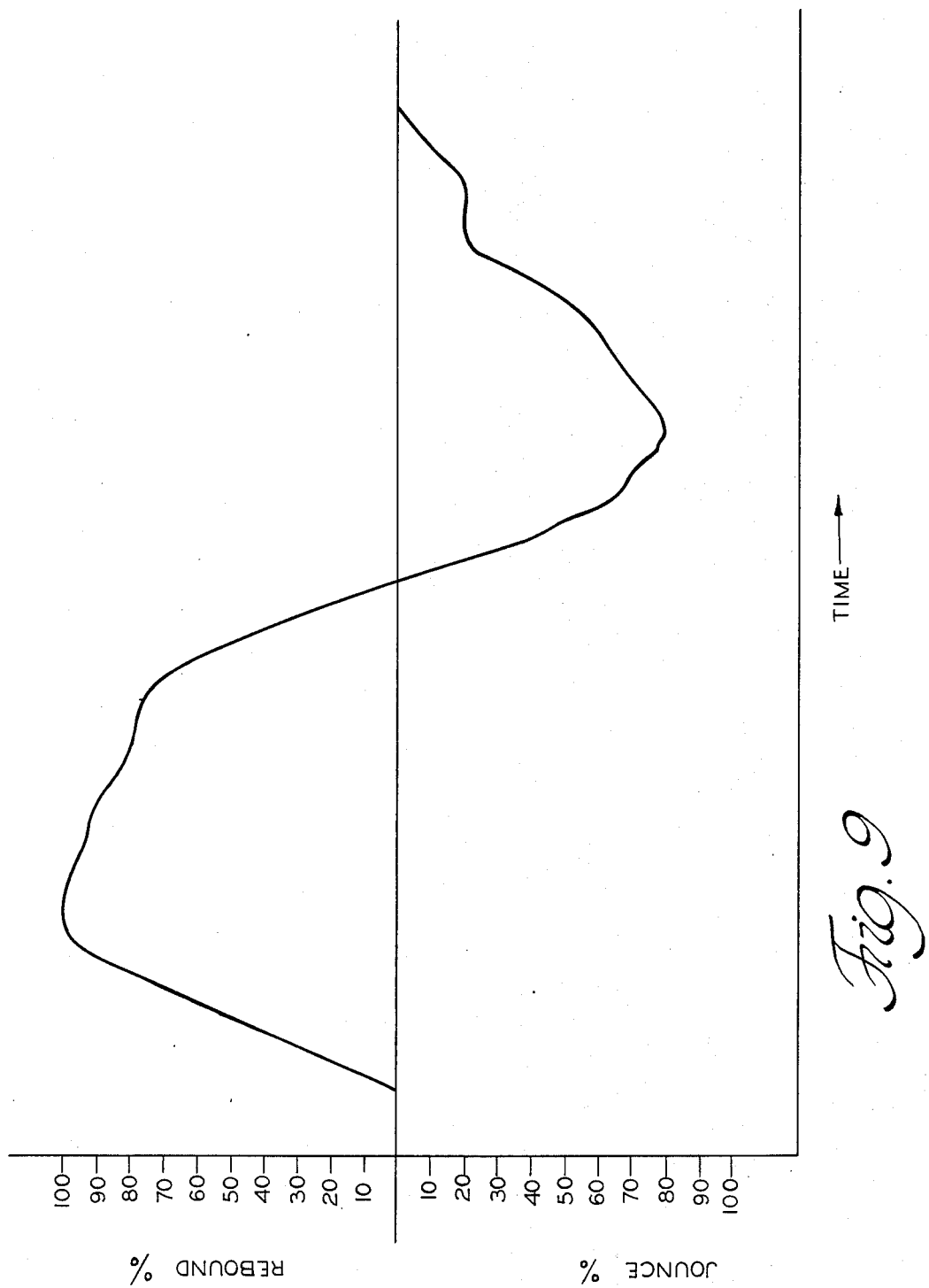

4,765,601

HYDRAULIC-ELASTOMERIC MOUNT

This is a continuation of application Ser. No. 902,060, filed on Aug. 26, 1986, now abandoned, which is a continuation of application Ser. No. 706,675, filed Feb. 28, 1985, now abandoned.

TECHNICAL FIELD

This invention relates to a hydraulic-elastomeric mount and more particularly to a combined damping decoupler and jounce rebound damping differentiator therefor.

BACKGROUND OF THE INVENTION

In the typical vibration isolating hydraulic-elastomeric mount used for vehicle engines, there is normally a pair of elastomeric walled chambers which are divided by a rigid partition and are interconnected by an orifice either through or around such partition to produce a damping effect. However, such damping is not desirable under all circumstances. In the case of isolating and absorbing engine vibrations, it is desirable that there be little or no hydraulic damping at low amplitudes and frequency. To this end, there has evolved both a displaceable partition and a so-called "decoupler" member mounted for limited reciprocal movement thereon, both of which operate to effect cyclic volume change in the chambers at low frequencies and amplitudes without forcing liquid through the orifice and thus without its hydraulic damping. Examples of such hydraulic-elastomeric mounts representative of the present state of the art are disclosed in copending U.S. patent application Ser. No. 678,356, filed Dec. 5, 1984 which is a continuation-in-part of Ser. No. 461,612, filed Jan. 27, 1983, and Ser. No. 689,139, filed Jan. 7, 1985 which is a continuation-in-part of Ser. No. 554,526, filed Nov. 23, 1983 (now abandoned) and all assigned to the assignee of this invention. While such features have provided substantially improved engine vibration isolation and absorption, it has been found that improved road isolation for the engine and in particular reduced harshness on medium-to-hard impacts can be realized like in vehicle suspension shock absorbers and strut cartridges by also differentiating the hydraulic damping between jounce and rebound. In vehicle suspension shock absorbing devices the damping differentiation is normally provided by fine tuning a valve system so that there is less damping during wheel jounce than rebound.

SUMMARY OF THE INVENTION

The present invention provides a simple, cost-effective means for incorporating a jounce rebound damping differentiator in a hydraulic-elastomeric mount where the decoupler is mounted in an opening through the partition and overhangs such opening on the opposite sides of the partition so as to engage therewith to limit its reciprocal travel and thereby the damping decoupling effect provided thereby. In arriving at the present invention, it was observed that the decoupler reciprocates once each engine jounce-rebound cycle at frequencies within a range where road isolation improvement is desired and this is used to advantage as will now be explained. According to the present invention, one or more bypass or secondary orifices are formed in the partition adjacent to the opening therethrough for the decoupler. One of the decoupler overhangs is then extended to cover such bypass orifices so as to serve as a check valve therefor during its normal decoupler operation. Importantly, the one decoupler overhang selected to serve as the check valve is that which during its normal decoupler movement will then also open the bypass orifices during engine jounce and close same during engine rebound. With the check valve closing the bypass orifices during engine rebound the only fluid flow route from one chamber to the other is through the normal or primary orifice in the normal manner. But then during engine jounce and when the check valve opens because of its normal decoupler movement, the additional fluid flow allowed through the bypass orifices results in desirably less damping for improved road isolation. Moreover, it will be appreciated that this additional damping feature has been accomplished with only slight modification of existing parts and without requiring any additional part(s).

DESCRIPTION OF THE PREFERRED EMBODIMENT

These and other objects, features and advantages of the present invention will become more apparent from the following description and drawing in which:

FIG. 1 is a side view partially in section of a hydraulic-elastomeric mount incorporating the preferred embodiment of the present invention.

FIG. 2 is a top view of the hydraulic-elastomeric mount in FIG. 1.

FIG. 3 is a sectional view taken along the line 3—3 in FIG. 1.

FIG. 4 is an enlarged partial sectional view taken along the line 4—4 in FIG. 3 and showing the decoupler in its alternative position.

FIG. 9 is a graph illustrating the jounce and rebound operation of the hydraulic-elastomeric mount in FIG. 1.

Figure 5:
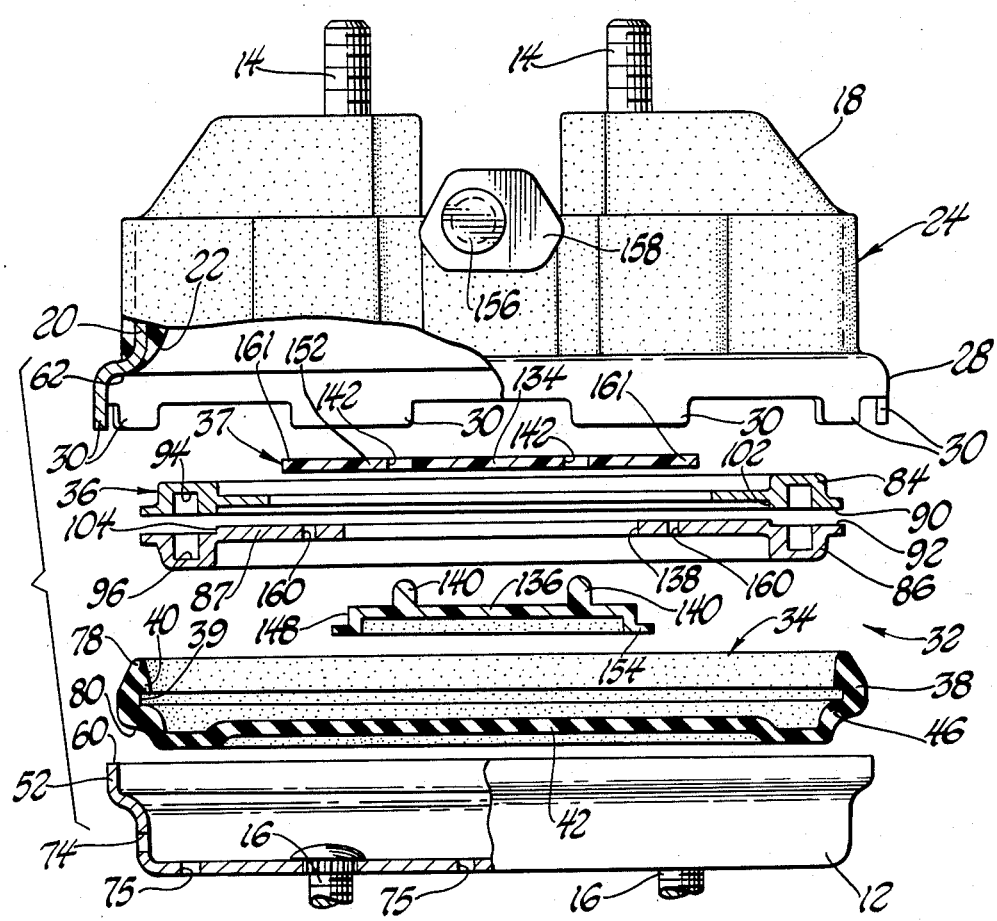
FIG. 5 is an exploded view of the parts of the hydraulic-elastomeric mount in FIG. 1.

Referring to the drawings, there is shown in FIGS. 1-8 a hydraulic-elastomeric mount incorporating the present invention and adapted for mounting an engine in a vehicle. The mount has a generally rectangular shape as viewed from the side in FIG. 1 and a generally oval shape as viewed from the top in FIG. 2 and comprises a yoke-shaped cast aluminum mounting member 10 and an oval dish-shaped stamped sheet metal mounting member 12. The mounting members 10 and 12 each have a pair of studs 14 and 16 respectively projecting outward therefrom for attachment to an engine (not shown) and an engine supporting member such as a frame or cradle (not shown) of the vehicle. A hollow elastomeric body 18 made of natural or synthetic rubber interconnects the mounting members 10 and 12 and to this end, is molded to and about the yoke-shaped mounting member 10 and also to the interior and exterior of an oval-shaped stamped sheet metal retainer 20.

The elastomeric body is configured such that it essentially completely defines a hollow cavity 22 therein extending beneath and about the yoke-shaped mounting member 10 and interiorly of the retaining member 20 so as to positively prevent any leakage from the cavity outwardly past these parts while also having extensive surface attachment therewith. Moreover, the mounting member 10 with its studs 14, the elastomeric body 18 and the retainer 20 form a subassembly shown and designated as 24 in FIG. 5. And it will be seen that the subassembly 24 is configured such that the elastomeric body can be molded to these parts in a conventional two-piece mold without separate or loose core pieces using either injection or transfer molding and with little finishing such as flash rubber removal required. And this includes the formation of directional rate control effecting voids within the elastomeric body itself and as a part of the liquid cavity. For example, with diametrically oppositely located voids 26 (only one of which is exposed in FIG. 1), the mount is provided with a high or hard rate in one crosswise direction and both a relatively soft or low rate at low amplitudes and a non-linear high or hard rate at high amplitudes in a direction transverse thereto (vertical and horizontal directions respectively as viewed from the top in FIG. 2), such differences in rates being especially useful in isolating certain combustion engine vibrations as is well known in the art.

The retainer 20 has an outwardly projecting collar 28 at its lower periphery with a plurality of circumferentially spaced tabs 30 which are initially formed to project straight downward as shown in FIG. 5 to allow the collar 28 to receive a second subassembly 32. The latter subassembly comprises the other mounting member 12, an oval-shaped elastomeric diaphragm 34 made of natural or synthetic rubber, an oval-shaped partition and orifice assembly 36 and a hydraulic damping decoupler assembly 37. The elastomeric diaphragm 34 has an annular rim section 38 with a radially inwardly facing internal groove 39 and the shoulder 40 forming the side of the groove opposite the spanning central portion 42 of the diaphragm is flexible to receive the periphery of the partition and orifice assembly 36. The periphery of the partition and orifice assembly is thus elastomerically sandwiched as shown in FIGS. 1 and 3 between the shoulder 40 and the shoulder 46 forming the opposite side of the groove, the latter shoulder being formed integral with and extending radially outward from the central diaphragm portion 42 to join the latter with the diaphragm rim portion 38.

The lower mounting member 12 is formed with a collar 52 to receive the rim 38 of the diaphragm 34 with the partition and orifice assembly 36 in place and the damping decoupler assembly 37 having been previously assembled to the latter as will be described in more detail later. The resulting subassembly 32 is then adapted to be fit into the collar 28 of the retainer 20 of the other subassembly 24 prior to bending over of the tabs 30 to retain the whole mount assembly together. In such fit, the lower mounting member 12 is telescopically received in the retainer collar 28 with the rim 38 of the diaphragm pressed therebetween whereafter the tabs 30 of the retainer are bent over the collar 52 of the lower mounting member to retain the subassemblies 24 and 32 together as shown in FIGS. 1 and 3. In such assembly, the upper edge 60 of the collar 52 of the lower mounting member engages the radial shoulder 62 of the collar 28 of the retainer 20 to determine the preload on the diaphragm rim 38 which plays a part in amplitude control as well as sealing as will be described in more detail later.

As seen in FIGS. 1 and 3, the elastomeric diaphragm 34 closes the elastomeric body 18 so as to form therewith a closed cavity generally designated as 64 which is divided by the partition and orifice assembly 36 into a primary chamber 66 enclosed by the elastomeric body 18 and a secondary chamber 68 enclosed by the diaphragm 34. However, prior to the closure of the cavity 64 at assembly, it is filled with a liquid antifreeze solution.

Assuming at this point that there is an orifice interconnecting the chambers 66 and 68, liquid in the primary chamber is forced to flow through such orifice at a restricted rate into the secondary chamber upon contraction of the primary chamber and in the opposite direction on expansion thereof to thereby provide a damping effect. Upon contraction of the primary chamber 66, the annular wall section 72 of the elastomeric body 18 extending between the mounting member 10 and the retainer 20 (see FIG. 1) is caused to bulge outwardly while the liquid therein is forced to flow through the orifice into the chamber 68 to expand the latter as permitted by the elasticity of the diaphragm central portion 42. Then on reversal in amplitude and resultantly expansion of the primary chamber 66, the stretched central diaphragm portion 42 retracts and thereby contracts the secondary chamber 68 forcing the liquid to flow back through the orifice into the primary chamber to complete the damping cycle. To assure otherwise free expansion and contraction of the secondary chamber 68, the space 73 between the diaphragm 34 and the lower mounting member 12 is vented to atmosphere through a plurality of radial holes 74 formed in the side of the latter part. In addition, a plurality of drain holes 75 provided in the bottom of the mounting member 12 prevent the accummulation of water therein which might freeze and present an obstacle to the movement of the diaphragm 34.

By virtue of the diaphragm 34 being configured at its rim 38 to both extend around and over the periphery of the partition and orifice assembly 36, there is formed a seal not only between the chambers but also a double seal between the chambers and the exterior resulting in excellent sealed integrity of the mount. Moreover, the diaphragm 34 is configured so as to permit limited substantially free or soft travel of the partition and orifice assembly 36 relative to the mounting members 10 and 12 below a predetermined low vibration amplitude of one mounting member relative to the other and to prevent such relative travel above such amplitude so that the flow through the orifice between the chambers to effect damping does not occur until such prescribed low vibration amplitude is exceeded. This limited substantially uninhibited partition movement provides precise amplitude control and is simply effected with a predetermined compliance of the diaphragm rim 38 between the sandwiching retainer 20 and the lower mounting member 12. To this end, the diaphragm rim 38 is free formed as shown in FIG. 5 so as to have adjacent its perimeter an annular angular sealing bead 78 and an annular flat sealing portion 80 that face in opposite directions and have more effective compliance than the radially inwardly extending wall sections of the groove shoulders 40 and 46 which sandwich the partition and orifice assembly 36. There is thus substantially more compliance for sealing particularly as provided by the raised face sealing bead 78 which is deflected at assembly as shown in FIGS. 1 and 3 so as to tightly seal against the retainer member 20 while the partition capturing elastomeric shoulder or wall sections 40 and 46 are preloaded to a predetermined extent depending on the amplitude responsiveness desired as determined by the edge 60 of the lower mounting member engaging the radial shoulder 62 of the retainer collar 28. On the other hand, the hydraulic biased partition and orifice assembly 36 is alternately forced against the elastomeric shoulders 40 and 46 of the diaphragm rim so as to maintain tight sealing between the chambers 66 and 68.

Figure 6:
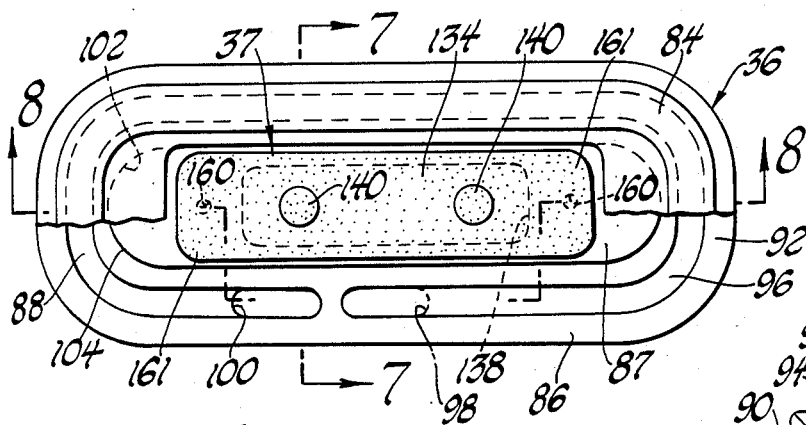
FIG. 6 is a top view of the partition and decoupler-damping differentiator device in the hydraulic-elastomeric mount in FIG. 1.
Figure 7:
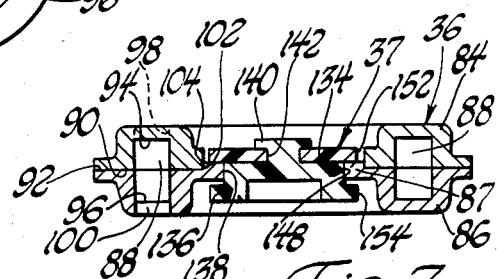
FIG. 7 is a sectional view taken along the lines 7—7 in FIG. 6.

The partition and orifice assembly 36 is of die cast metal construction as shown or may be plastic and comprises a pair of oval-shaped plates 84 and 86 with matching peripheries. As best seen in FIGS. 1 and 3, the lower plate 86 has a cavity-spanning wall 87 which acts to separate the chambers 66 and 68 while the other plate 84 simply serves to cooperate with the lower partition plate to define in a minumum of space a damping orifice 88 interconnecting the two chambers in a manner such that the latter plate requires substantially less material since it need only be of annular or ring-shaped configuration as shown. To this end, the upper annular plate 84 and the lower partition plate 86 have flat annular extending mating faces 90 and 92 which are each formed with a double-ended channel 94 and 96 therein that are of uniform depth and cross-section and wall thickness and cooperatively define the orifice 88 as a planer (non-spiralling) passage extending between the plates adjacent their periphery along an oval path just inwardly of and along the diaphragm rim 38. In addition, the plates 84 and 86 are each formed with an oval-shaped, right-angled opening 98 and 100 therethrough to one end only of their respective channel 94 and 96 and thereby to one end only of the orifice 88 so that it interconnects the chambers and with a length which may thereby be made substantially as expansive as the periphery of the plates as best seen in FIG. 6. Furthermore, the plates 84 and 86 are formed with interfitting inner shoulders 102 and 104 which cooperate to provide accurate fitting together of the plates and in particular proper alignment of the channels 94 and 96 in defining the orifice. With the plates 84 and 86 accurately aligned by such locators 102 and 104, the plates need not be further retained together by some additional fastening against separation of their mating faces 90 and 92 as the preload on the diaphragm rim 38 at final assembly acting at the shoulders 40 and 46 of the rim groove which captures the plates provides an adequate clamping load to maintain the plate faces in tightly sealed contact.

Turning then to the hydraulic damping decoupler assembly 37, this device is formed by two simple injection-molded parts 134 and 136 preferably made of plastic which are fixed together by a double rivet connection through a central opening or window 138 in the partition wall 87 of the lower plate 86 so as to have limited free travel with respect thereto as shown. The riveted connection of the two damping decoupler parts is provided by the formation of two integral upstanding cylindrical pins 140 on the lower decoupler part 136 which engage through the partition plate opening 138 and with corresponding round holes 142 in the upper decoupler part whereafter the heads of these pins are heat-formed to act as rivets to hold the upper decoupling part to the lower one.

Limited volume change in the chambers 66 and 68 to effect elimination of the hydraulic damping below a prescribed low amplitude at low frequencies is provided by the lower decoupler part 136 being formed with an upstanding piston or volume displacement portion 148 which is slidably received in the partition plate opening 138. The opening 138 thus serves as a cylinder for the piston 148 which has a height greater than the cylinder length (i.e. the thickness of the partition wall 87) so as to have limited travel or stroke with respect thereto as determined by the respective rims 152 and 154 of the decoupler parts 134 and 136 which sandwich and are alternately sealingly abuttable with the opposite sides of the partition wall 87 about the opening 138 as best seen in FIGS. 1, 3, 4, 7, and 8. And because such limited free travel is dependent on only one wall thickness which is that of the single partition wall 87, the decoupler tolerance is much simpler to control than if there was a double wall. Moreover, the decoupler piston 148 and its cylinder 138 have a rectangular cross-section and profile respectively that prevent the decoupler assembly from turning in the partition to thereby maintain side clearance between the decoupler parts 134 and 136 and the other portions of the respective plates 84 and 86. The decoupler parts 134 and 136 each have a low profile rectangular box shape occupying the respective chambers and the decoupler piston 148 by virtue of its limited free travel with respect to the partition and in response to slow alternating pressure buildup in the two chambers 66 and 68 effects cyclic volume change in the chambers so as to permit vibratory amplitudes at low frequencies such as up to 2 Hz without forcing liquid to flow therebetween via the orifice 88. This effectively eliminates hydraulic damping below the prescribed low vibratory amplitude for further damping control in the mount apart from that provided by the above-described compliant diaphragm rim 38. The damping decoupler assembly 37 also substantially extends the range of usage of the mount in that the amplitude control by the diaphragm rim is relatively limited and may better remain constant so as not to require changes in the associated other parts while the volume displacement size of the damping decoupler can be readily changed to meet various amplitude control criteria without requiring other changes in the mount simply by varying the cross-sectional area and/or stroke of the decoupler piston 148. And it will now be recalled that the retainer 20 is connected by the elastomer body 18 to the upper mounting member 10 but is mechanically connected to the lower mounting member 12 by the bent over tabs 30 at final assembly. To assure that the mounting members 10 and 12 remain connected in the event that the elastomeric connection between the retainer 20 and the mounting member 10 is lost, there is provided a steel pin 156 which traverses the yoke-shaped mounting member 10 between its studs 14 and is secured at its opposite ends to a pair of upstanding flanges 158 formed on the retainer 20 as shown in FIGS. 1, 2, 3 and 5.

The hydraulic-elastomeric mount as thus far described, and apart from modifications of both the decoupler assembly 37 and partition plate 87 as will subsequently be described, is similar to that disclosed in the afore-mentioned copending U.S. patent application Ser. No. 554,526, now U.S. Pat. No. 4,588,173, which is hereby incorporated by reference. And reference is made thereto for a more detailed understanding of the various parts of the mount apart from what has already been described and will be further described.

Figure 8:
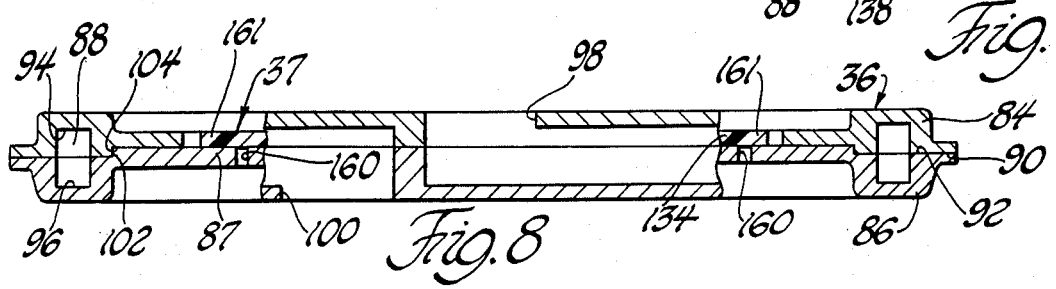
FIG. 8 is a sectional view taken along the line 8—8 in FIG. 6.

Describing now the details of the preferred embodiment of the present invention, jounce rebound damping differentiation is simply added to such an existing mount by forming one or more bypass or secondary orifices in the form of holes 160 (two being shown) through the partition wall 87 of the lower partition plate 86 adjacent to the oposite ends of the decoupler opening 138 therethrough. Then knowing that less damping is preferred in engine jounce than rebound, the upper decoupler part 134 is simply extended in length at its opposite ends 161 so as to cover these holes and thereby serve as a check valve which operates to close these holes as shown in FIGS. 3 and 8 when the pressure in the primary chamber 66 is greater than that in the secondary diaphragm chamber which occurs during rebound of the engine as sensed at the mount so that flow between the chambers is then only through the regular or primary orifice 88 in the normal manner. But then on the pressure differential reversal accompanying the immediately following jounce of the engine as sensed at the mount, the decoupler-check valve 134, 136, 161 is forced thereby to uncover these holes or secondary orifices as shown in FIG. 4 to permit flow therethrough in addition to that through the primary orifice 88 so that there is then less damping during the engine jounce condition. And thus it will be appreciated that jounce rebound damping differentiation is provided with only slight modification and without having to add any additional parts since only existing parts are utilized in the formation of both the check valve and the bypass passage controlled thereby. The improved performance that results from the addition of such jounce versus rebound damping differentiation is illustrated in FIG. 9 by a relative force sinusoidal curve depicting the relative magnitude of damping difference of an actual mount constructed according to the present invention. As can be seen in this particular adaptation of the invention, there was effected a 20% reduction in the jounce direction.

Having thus described the preferred embodiment, it will be appreciated by those skilled in the art that improved road isolation and in particular reduced harshness on medium to hard impacts is possible and with minimal modification of an existing engine mount as compared with having to add those parts normally required with such a valving system. Furthermore, it will be appreciated that the above described invention may be modified within the scope of the appended claims.

The embodiments of the invention in which an exclusive property or privilege is claimed are defined as follows:

1. In a hydraulic-elastomeric vehicle engine mount having a pair of rigid mounting members, a hollow elastomeric body operatively connecting the members, an elastomeric diaphragm cooperating with the body to form a closed cavity that is substantially filled with a liquid, a rigid partition dividing the cavity into a chamber enclosed by the body and a chamber enclosed by the diaphragm, and elongated damping orifice having a length substantially greater than its width dimension connecting the chambers so as to provide hydraulic damping as one mounting member is forced to vibrate relative to the other in opposite directions at varying amplitudes and frequencies, a singular rigid damping decoupler mounted for free limited reciprocal movement on the partition so as to effect cyclic volume change in one and then immediately the other of the chambers and thereby permit vibratory amplitudes below a prescribed level and frequency without forcing liquid through the orifice and thus without hydraulic damping, the improvement comprising a secondary orifice through said partition for connecting said chambers, and singular rigid jounce-rebound control valve means solely on and movable with said decoupler for essentially immediately closing said secondary orifice to prevent flow threrethrough between said chambers on pressure buildup in one of said chambers and essentially immediately opening same to permit flow therethrough between said chambers on pressure buildup in the other chamber so as to essentially immediately effect a reduction in the hydraulic damping normally provided by said damping decoupler in one of said force directions as compared with that in the other force direction during the damping decoupler operation.

2. In a hydraulic-elastomeric vehicle engine mount having a pair of rigid mounting members, a hollow elastomeric body operatively connecting the members, an elastomeric diaphragm cooperating with the body to form a closed cavity that is substantially filled with a liquid, a rigid partition dividing the cavity into a chamber enclosed by the body and a chamber enclosed by the diaphragm an elongated damping orifice having a length substantially greater than its width dimension connecting the chambers so as to provide hydraulic damping as one mounting member vibrates relative to the other in opposite directions at varying amplitudes and frequencies, a singular rigid damping decoupler mounted for free limited reciprocal movement on the partition so as to effect cyclic volume change in the chambers and thereby permit vibratory amplitudes below a prescribed level and frequency without forcing liquid through the orifice and thus without hydraulic damping, the improvement comprising a secondary orifice through said partition for connecting said chambers, and singular rigid jounce-rebound control valve solely integral with a movement limiting portion of said decoupler for essentially immediately closing said secondary orifice to prevent flow therethrough between said chambers on pressure buildup in one of said chambers and essentially immediately opening same to permit flow therethrough between said chambers on pressure buildup in the other chamber so as to essentially immediately effect a reduction in the hydraulic damping normally provided by said damping decoupler in one of said force directions as compared with that in the other force direction during the damping decoupler operation.

* * * * *